United States Patent [19]
Clark

[11] 3,965,870
[45] June 29, 1976

[54] METHOD OF OPERATING AN INTERNAL COMBUSTION ENGINE WITH SOLVENT REFINED COAL AS A FUEL

[76] Inventor: Wallace Clark, 1830 S. German Church Road, Indianapolis, Ind. 46239

[22] Filed: Mar. 3, 1975

[21] Appl. No.: 554,633

[52] U.S. Cl. .................................................. 123/23
[51] Int. Cl.² ........................ F02B 45/04; F02D 19/04
[58] Field of Search ........................................ 123/23

[56] References Cited
UNITED STATES PATENTS

| | | |
|---|---|---|
| 1,837,620 | 12/1931 | Karl ........................................ 123/23 |
| 2,836,158 | 5/1958 | Harvey .................................... 123/23 |

*Primary Examiner*—Charles J. Myhre
*Assistant Examiner*—William C. Anderson
*Attorney, Agent, or Firm*—Melville, Strasser, Foster & Hoffman

[57] ABSTRACT

A method of using solvent refined coal as a fuel for an internal combustion engine is disclosed wherein the fuel is provided in finely divided form, the finely divided fuel being aspirated into the cylinder on a suction stroke and being heated by compression to a point at which the finely divided solid material liquefies into a fine spray which liquid spray is then ignited by a glow plug at a temperature of at least 1000° F.

5 Claims, 2 Drawing Figures

METHOD OF OPERATING AN INTERNAL COMBUSTION ENGINE WITH SOLVENT REFINED COAL AS A FUEL

BRIEF SUMMARY OF THE INVENTION

Solvent refined coal generally known as SRC (and hereinafter identified as SRC) from which sulfur and ash were almost entirely removed, was developed some ten years ago. SRC is available in various forms such as blocks, or pellets, and attempts have been made to use this material as a fuel for boilers for utilities as a replacement for petroleum products. These experiments have had questionable success.

SRC has some peculiar properties. A pile of pellets or block of the material will not flame when a blow-torch is applied to it, either in the open or in a container. However, if the material is melted and maintained at a temperature 300° to 400°F., (the exact temperature depending on its purity) it can be atomized and then if subjected to a sufficiently high temperature will burn. It does not vaporize at any readily obtainable temperature. The solid material melts and then the molten SRC in the form of refined spray will burn directly without vaporization.

Many attempts have been made in the past to operate engines on solid fuels. This goes all the way back to Huyghens in about 1680 with the use of gun powder as a fuel. The Diesel patents came out in the 1890's and were suggested by Carnot in 1824. The Diesel cycle is often referred to as the Carnot cycle. Diesel used coal dust in his 1892 patent by dumping it from a hopper above the engine into a rotary valve from which it was dropped into the cylinder.

During the second World War the Germans revived the concept of solid fuel and did further experimenting with Diesel's idea. The British also experimented with coal of very small size and some 10 years ago coal was tried at Howard University in Washington, D.C. by injecting it in a powdered form into a diesel engine. Attempts have also been made by railroads in this country to emulsify it with oil and inject it into diesel engines. None of these experiments was apparently successful.

The present automobile engine was developed by Otto in 1866 based on ideas suggested by deRochas and the cycle is generally referred to as the Otto cycle. Hornsby-Ackroyd in England developed the use of surface ignition and that liquid fuel engine is of lower compression and is often referred to as a semi-diesel.

According to the present invention, SRC is provided in very finely divided form, say of a size to pass through a 200 mesh screen. This powder-like substance is aspirated into the cylinder on the suction stroke, either by natural aspiration or positively by supercharging and the material is heated up on the compression stroke to a temperature of 300° to 400°F. at which the powder-like substance becomes a fine liquid spray. At the end of the compression stroke, the material is further heated up by a glow plug maintained at a temperature of at least 1000°F. and thereby the liquid spray solvent refined coal is caused to burn and produce a power stroke of the piston.

DETAILED DESCRIPTION

SRC is coal of any quality which is dissolved in a solvent made from the coal itself. It is treated at high temperature and pressure with hydrogen to remove the sulfur down to less than 1%, generally to 0.7% which is a level acceptable to the EPA. All of the ash can also be removed. The anthracine in the solvent is largely removed and since there is more solvent left over than when the process was started it is self-perpetuating.

The final product is absolutely uniform regardless of the quality of coal from which the SRC is produced. The final product can be shipped dry as a coarse powder or it can be mixed with water and pumped in a pipeline or it may be melted at a temperature of 300° to 400°F. and dropped in a cooling tower so as to solidify in pellets or in uniform lumps. When ground to a 200 mesh screen size SRC does not cake or deteriorate and it is non-abrasive so that it does not injure engine parts or crank case oil. It will not burn as a solid and will not burn as a liquid when melted unless it is atomized into a fine spray. The cost of SRC at this point is competitive with petroleum.

The present process according to the invention therefore involves providing SRC in finely divided form and substantially free of sulfur and ash. This material is aspirated either by suction or supercharging into an internal combustion engine. The engine may be a conventional reciprocating engine, or a modern rotary engine. In the rotary engine the rotor may be referred to as a piston, and the chamber within which it rotates may be referred to as a cylinder. By compression the temperature of the finely divided solid is raised to a temperature in excess of 300°F. whereby the finely divided solid particles melt and a fine liquid spray results. Finally this liquid spray is ignited by a glow plug in the cylinder head. The glow plug should provide a temperature of at least 1000°F in order to ignite the liquid spray.

Figure 1:
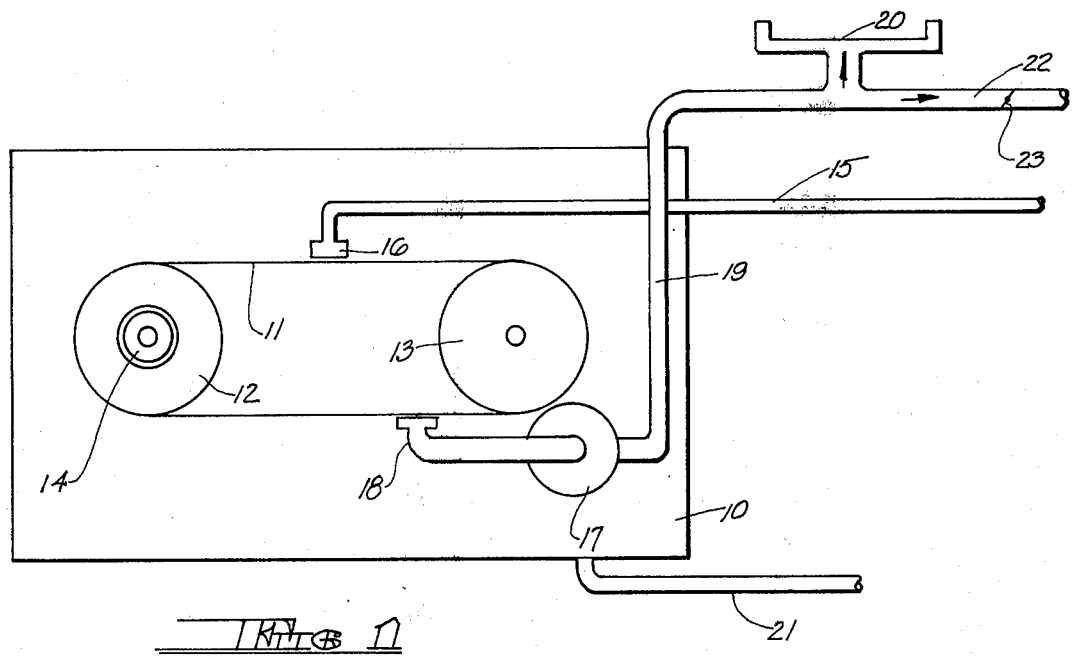
FIG. 1 is a diagrammatic view of a way in which the fuel may be fed to an engine.

Referring to FIG. 1, a small container 10 is provided at the engine. In this container a belt 11 passes over drums 12 and 13. The belt is driven by a small motor 14. The SRC in finely divided size is fed to the belt 11 by means of a flexible auger or other suitable arrangement generally indicated at 15. The material is dumped across the belt through a head 16.

A suction device is provided at 17 driven by a suitable motor which may be a variable speed motor, and this device provides a suction through the head 18 and blows the finely divided SRC through the pipe 19 to the intake manifold of the engine at 20. The belt 11 will be of a pile material or a pitted or porous fabric such that it will absorb and hold dust. Suitable means may be provided for brushing off excess SRC from the belt and the excess falls to the bottom of the container 10 from which it is returned to a supply source for recirculation. The return to the supply source may be through a line 21 which may also be an auger. Excess delivery to the manifold is returned to the supply source for recirculation through the line 22. A butterfly valve may be provided in the line 22 as at 23 and when this valve is closed or partially closed, it causes more SRC to be forced into the intake manifold 20 as by a supercharging.

Preferably the motor 14 is a variable speed motor or variable speed means are provided for the drum 12.

Thus the amount of fuel furnished to the engine and therefore the power can be varied by varying the speed of the motor driving the vacuum device 17 and also by varying the speed of the belt 11 or by adjusting ports on the pick-up element 18, or, as described above, by adjusting the butterfly valve.

Figure 2:
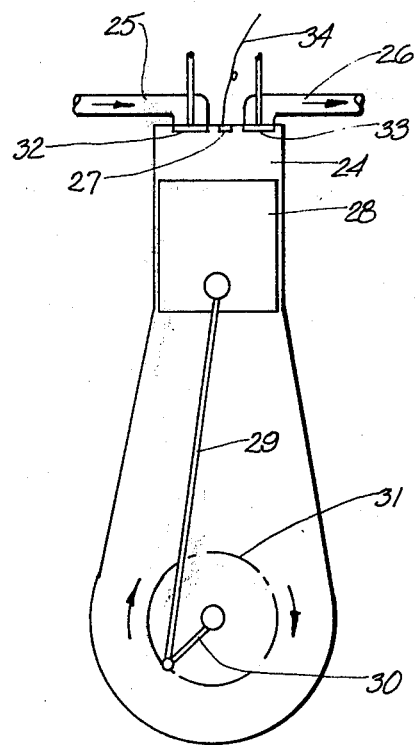
FIG. 2 is a diagrammatic representation of a cylinder and connecting rod and crank showing a glow plug.

In FIG. 2 the cylinder is shown at 24 with the fuel intake at 25 and exhaust at 26. A glow plug is indicated at 27. The piston 28 is connected to a connecting rod 29 which operates a crank 30 to turn the fly wheel 31 in a clockwise direction as shown in FIG. 2, or counter-clockwise, depending on cam positions for valve lifting, and obviously on the vantage point of the viewer. In the condition shown in this Figure, the piston 28 is moving upward in a compression stroke and both the intake and exhaust valves 32 and 33, respectively, are closed. A lead for energizing the glow plug is indicated at 34.

It will be clear that the representation of FIG. 2 is substantially a conventional engine, so that an existing engine can be converted to the use of SRC according to the present invention by adding a fuel system as, for example, a system shown in FIG. 1, by removing the spark plug or injector and the ignition system and replacing the spark plug or injector with a glow plug and controls for the glow plug. In this way present day engines, either diesels or other engines, can readily and relatively inexpensively be converted to the use of SRC. Such other engines would require a hotter glow plug to compensate for their lower compression. Among such other engines would be included non-reciprocating or rotary engines.

The fuel described herein does not boil and therefore does not vaporize even in the cylinder. It melts as soon as a compression stroke (assisted by heat from the glow plug) raises its temperature to 300° or 400°F. Thus the fuel is converted into a fine liquid spray without having to be atomized as in a diesel engine and therefore the timing of the atomized injection is no longer necessary. Furthermore, requirement for expensive and carefully fitted pumping devices normally serving each cylinder is eliminated. Ignition is obtained by a highly heated glow plug in the cylinder and the intensity of this heat can be varied and this variation serves the function of timing the burning of the fuel. It can be an automatic feature just as timing is varied on an automotive engine in relation to vacuum or in relation to the load on the engine by a conventional governor. These features were not a part of the Otto or present day automotive engine because spark intensity was not, and still is not varied as a timing adjustment. As distinguished from the automotive engine, the ignition system of the present engine requires no timing in relation to the position of the fly wheel and it requires no coil, condenser, distributor, or breaker points. Since it does not depend entirely on the heat of compression it is not a Diesel engine. Thus it differs from all prior types of engines which have attempted to use solid fuel. It is novel in that the fuel is liquefied in the cylinder to an atomized form without actual atomization and injection. The powder injection is not timed and dumped in as was the case in all prior solid fuel Diesel engines.

The use of SRC as described herein as a fuel has numerous advantages. It is a fuel which is similar to graphite in structure and therefore does not rapidly wear out the engine as other solid fuels in the past have done. However, since it is like graphite it burns like graphite, which means that it is very difficult to ignite. Thus it will be an absolutely safe fuel for motor vehicles. It is believed that on account of this difficulty of burning SRC, this material has been overlooked as a motor fuel. Herein there is taught a method of using SRC as a motor fuel wherein the disadvantages mentioned above become an advantage in preventing preignition and in eliminating the need of timing systems with a coil condenser distributor or injectors, all of which are necessary in the handling of volatile fluids.

It should be understood that the arrangement of FIG. 1 is exemplary only and that numerous modifications may be made in how the SRC is introduced to the engine. No limitation not specifically set forth in the claims is intended and no such limitation should be implied.

The embodiments of the invention in which an exclusive property or privilege is claimed are defined as follows:

1. The method of operating an internal combustion engine with SRC as a fuel, which includes the steps of
   a. providing the SRC in finely divided form and substantially free of sulfur and ash,
   b. aspirating the finely divided SRC into an internal combustion engine cylinder during the suction stroke of the piston in said cylinder,
   c. causing said finely divided SRC to liquefy in the form of a fine spray during the compression stroke of said piston, and
   d. providing a glow plug in the cylinder above piston travel whereby said fine liquid spray is ignited by said glow plug to produce a power stroke of said piston.

2. The method of claim 1, wherein said SRC is of a particle size to pass through a 100 mesh or finer screen.

3. The method of claim 1, wherein said glow plug provides a temperature of at least 1000°F.

4. The method of claim 1, wherein the compression stroke of the piston, with the additional energy from the glow plug, is such that the SRC is heated to melting temperature.

5. The method of claim 1, wherein said SRC is supercharged into the cylinder.

* * * * *